United States Patent
Tarr (10) Patent No.: US 8,375,621 B1
(45) Date of Patent: Feb. 19, 2013

(54) FISHING POLE HOLDER WITH ADJUSTABLE STRIKE INDICATOR AND SIGNAL FOR LOW VISIBILITY CONDITIONS

(76) Inventor: David Tarr, South Lyon, MI (US)

( * ) Notice: Subject to any disclaimer, the term of this patent is extended or adjusted under 35 U.S.C. 154(b) by 474 days.

(21) Appl. No.: 12/592,697

(22) Filed: Dec. 1, 2009

(51) Int. Cl.
*A01K 97/12* (2006.01)
(52) U.S. Cl. ................................. 43/17; 43/16
(58) Field of Classification Search ............... 43/15–17, 43/21.2; 248/511, 514, 534, 535, 538, 540, 248/541
See application file for complete search history.

(56) References Cited

U.S. PATENT DOCUMENTS

| | | | |
|---|---|---|---|
| 5,035,074 A | 7/1991 | Tylkowski | |
| 5,050,332 A * | 9/1991 | Cross | ................................. 43/15 |
| 5,142,809 A * | 9/1992 | O'Brien et al. | ................ 43/21.2 |
| 5,987,801 A | 11/1999 | Anderson | |
| 6,094,852 A | 8/2000 | Roach | |
| D452,551 S | 12/2001 | Gonnello | |
| 6,354,036 B1 | 3/2002 | Carlson et al. | |
| 6,594,941 B1 | 7/2003 | Anderson | |
| 6,646,557 B2 * | 11/2003 | Brake | ........................ 340/573.2 |
| 2006/0070290 A1* | 4/2006 | Toy | .................................. 43/15 |

* cited by examiner

*Primary Examiner* — Darren W Ark
*Assistant Examiner* — Kathleen Iwasaki
(74) *Attorney, Agent, or Firm* — Barbara M. Burns

(57) ABSTRACT

A device for holding a fishing pole. The device employing a hollow elongated pole holder for fishing pole with elongated slots wherein a trigger is positioned. The trigger is adjustable for various weights of poles and tackles. The trigger comprises a swing arm adjustable to weight of the fishing tackle. A signal indicates a strike on the line. Sensitivity of the signal can be adjusted. A frame holds the pole holder and the pole holder is angularly positionable in relation to the frame. Removable pins are used to hold the pole holder pivotably to the frame and to a mounting plate. Another removable pin allows the pole holder to be angularly adjusted. The device can mounted to boats, docks, the ground or to ice.

4 Claims, 9 Drawing Sheets

FISHING POLE HOLDER WITH ADJUSTABLE STRIKE INDICATOR AND SIGNAL FOR LOW VISIBILITY CONDITIONS

BACKGROUND OF THE INVENTION

The field of the invention pertains to fishing and, in particular, to the holding of a fishing pole.

A fishing pole either must be held by hand or positioned so that the user can quickly retrieve the pole when a fish has struck a hook attached to a line from the pole.

A problem is that a fishing pole holder may be designed and be usable for only one type of pole and/or rod and reel, such as for a short curved ice fishing pole, a hand pole, an on-shore pole, an off-shore pole, or other types of poles.

Another problem is that the time between fish strikes can be unpredictable and the user of the fishing pole may not be closely observing the pole or may be out of sight of the pole for a period of time. This is a particular problem at dawn, at dusk and during night time fishing.

A need existed for a universal fishing pole holder for many different types of poles of differing weights, some having reels that the fishing pole holder device notifies the user that a fish strike is occurring and that allows for a fish strike to be indicated during high visibility situations as well as low visibility situations.

SUMMARY OF THE INVENTION

The invention is a holding device for holding a fishing pole and/or reel while waiting for a fish strike and a strike indicator to indicate a fish is on the line.

The holding device can be used for a variety of different types of poles of different weights and in a variety of different fishing locations. There are many types of fishing poles, some employing reels. The holding device is adjustable for the weight of different poles with tackle.

The holding device of the invention can indicate a fish strike is occurring and moreover allow a fish strike to be indicated during high visibility situations as well as low visibility situations. Sensitivity of the signal indicator for a strike can be adjusted.

The holding device can be formed from tubing having a round shape, square shape or other shape and it can be formed of PVC or other suitable materials such as aluminum or other metals or plastics. The holding device comprises a hollow elongated pole holder for holding a pole inserted therein, a frame supporting the pole holder, a trigger adjustable to various weights of poles and tackle, a signal device and a mount to position the holding device at a desired location.

The hollow elongated pole holder for holding a pole inserted therein employs several elongated slots through the pole holder aligned to each other and to the center line of the hollow elongated pole holder. The elongated slots are located near to the end away from the end into which a fishing pole is inserted and each elongated slots is contiguous and does not extend/break-out to the end of the hollow elongated pole holder. A trigger is positioned through the several elongated slots. The trigger is adjustable for various weights of poles and tackles. The trigger comprises a swing arm attached to a connector tubing, a main spring, an adjustment plate, a lock down bolt, a washer and a tension knob or nut to lock the main spring in position along the swing arm to provide different levels of tension to trigger the device. When the tension knob is unscrewed to loosen, the main spring can be moved along the swing arm thereby allowing adjustment of the trigger for use for a range of fishing poles and tackle having a weight from light to heavy. Thereafter, the tension knob is tightened to lock the trigger at the desired location and for the weight of the fishing pole as selected by the user.

Downward pressure from pull on the line of a fishing pole pivots the pole holder down releasing the signal arm. Operation of the device is caused by pull weight required to pivot the angular adjustment of the pole holder, the placement of the main spring along the swing arm and the sensitivity of the strike indicator.

A clevis pin is placed through apertures in the frame and through apertures in the pole holder allowing the pole holder to be pivoted. A washer is interposed between the frame and the locking end of the clevis pin.

Another clevis pin is positioned through the frame that stabilizes and locks the swing arm in position allowing the main spring to be moved along the length of the swing arm. An end cap can close the end of the hollow elongated pole holder away from the end the pole is inserted into.

A frame of metal or plastic partially surrounds and is pivotably connected with the hollow elongated pole holder. The frame is attached to the hollow elongated pole holder with a locking device, such as a clevis pin.

The frame has apertures provided on opposite sides through which a lock mechanism, such a clevis pin can be inserted though both the frame and the hollow elongated pole holder in order to lock the pole holder in a desired angular position. The hollow elongated pole holder is locked in angular position with the frame with a locking mechanism, such as a clevis pin inserted therethrough. The locking mechanism that locks the hollow elongated pole holder to the frame also engages with and applies tension to the swing arm of the trigger with a resultant stabilization of the swing arm.

Thusly, can the pole holder be adjusted and angled 90 degrees from a horizontal orientation to a vertical orientation in relation to the frame and clamped in a position as desired in order to angle a fishing pole held within the device. The parts of the device can be connected by mechanical means, such as nuts and bolts.

The strike indicator attaches to the pole holder and comprises a spring, a rod extending from the spring and terminates in a signaling device, such as a signal flag. The strike indicator is adjustable for a response from a light pull on the line to a response from a heavy pull on the line. The strike indicator is held in position with the connector, such as a clevis pin that pivotably connects the hollow elongated pole holder with the frame. The free end of the rod for the signal flag is held by the bail of the clevis pin. The clevis pin for this purpose has an angle on the bail of the clevis pin allowing for the free end of the rod to be slid under the bail in a sideways motion. The clevis pin can be turned on its axis allowing the point of the angle on the bail of the clevis pin to move to adjust the tension quickly and simply on the free end of the signal rod by moving nearer to the end of the signal rod or farther from the end of the signal rod. The closer to the end of the signal that the bail is positioned the more sensitive and quicker the release of the rod will be and the resultant signaling.

For use during low visibility conditions, the flag can be of a reflective material so that the user can direct a light to the pole holding device to check the position of the signal flag.

Alternately, a luminous light storage material can be pre-activated by a light source for greater visibility when a fish strike occurs. A pre-activated light source can affixed to the signal rod by a connecting bracket.

A mount connects from the frame to a multiplicity of surfaces, such as a deck, a wharf, a bridge, a truck or car, the ground, a post, the surface of ice, an auger for boring into the shore or into ice, a bucket, or to other surfaces. The mount can be configured in differing configurations for flat mounting to a surface or with a hook or spring to hang from a vertical surface. The hollow elongated pole holder is quickly detachable from the mount by removing a clevis pin. The frame can be quickly rotated on the mount into a different rotational location.

For a more complete understanding of the present invention, reference is made to the following detailed description when read with in conjunction with the accompanying drawings wherein like reference characters refer to like elements throughout the several views, in which:

DESCRIPTION OF THE PREFERRED EMBODIMENT

Figure 1:
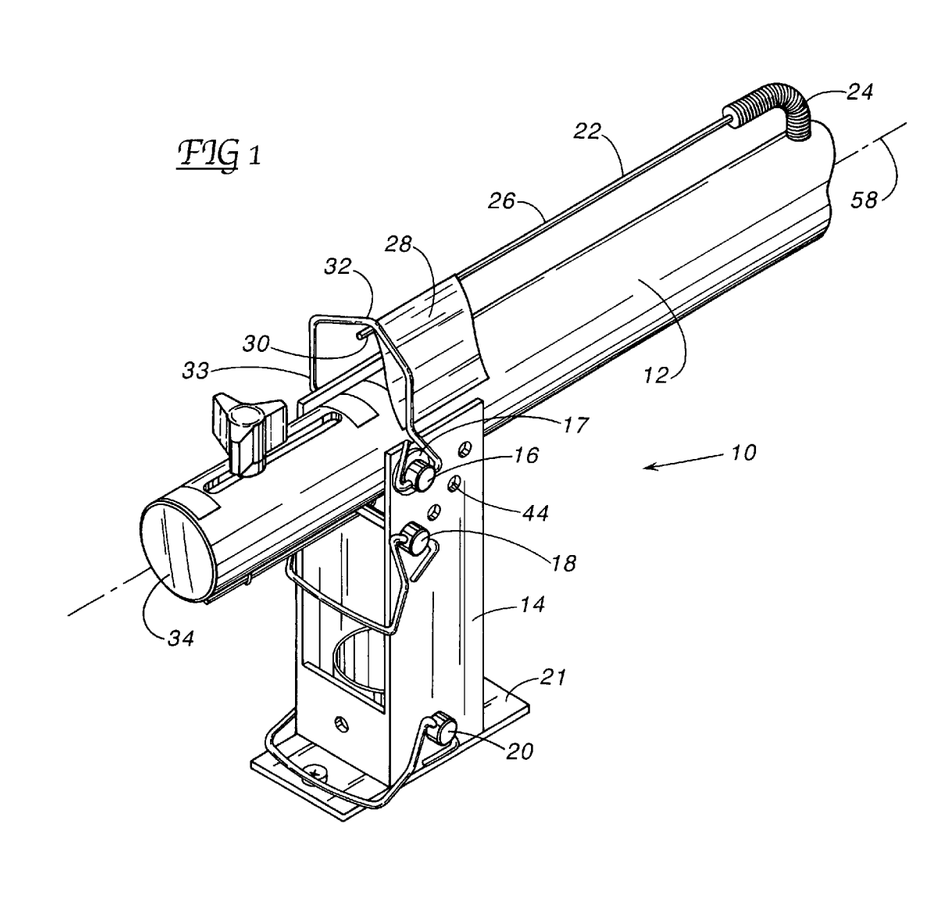
FIG. 1 illustrates an isometric view of the new holding device for holding a fishing pole therein.
Figure 2:
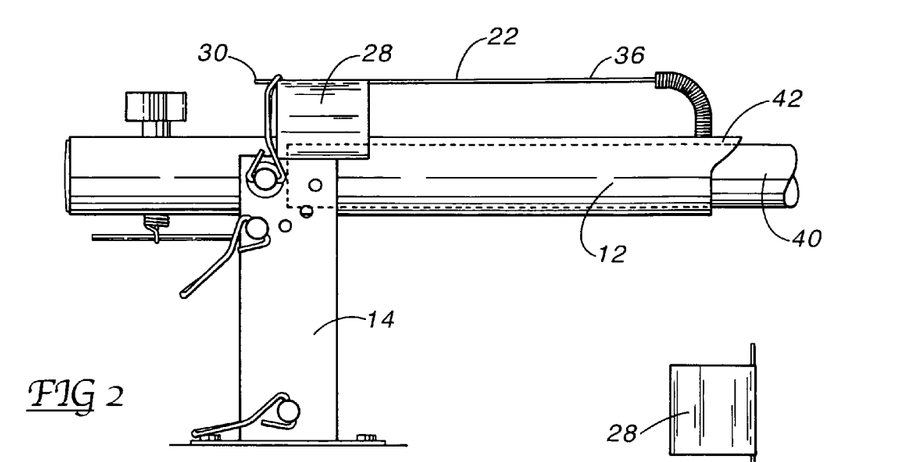
FIG. 2 illustrates a front view of the new holding device with the hollow elongated pole holder in a horizontal position holding a fishing pole with the signal rod held in the non-signal position.
Figure 3:
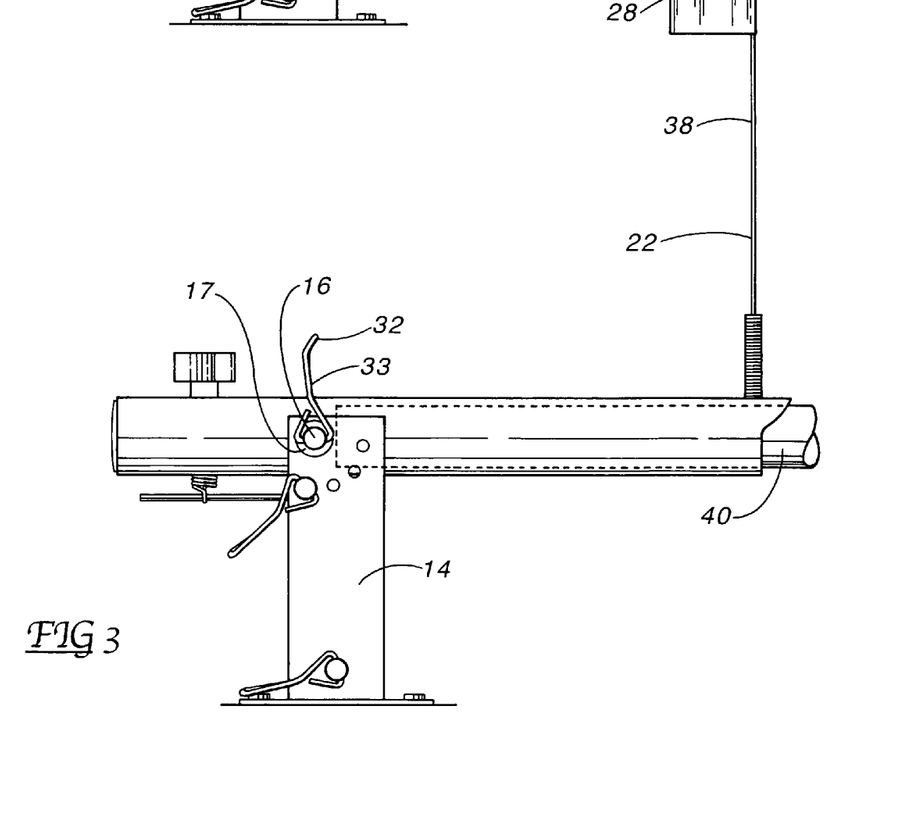
FIG. 3 illustrates a front view of the new holding device with the hollow elongated pole holder in a horizontal position holding a fishing pole with the signal rod in the signal position.

Illustrated in FIGS. 1, 2 and 3, new device 10 is shown. Pole holder 12 of new device 10 is pivotably attached to frame 14 with a clevis pin 16. Washer 17 fits between clevis pin 16 and frame 14. Frame 14 employs clevis pin 18 to maintain pole holder 12 in angular position to frame 14. Clevis pin 20 connects frame 14 to mount 21.

Strike indicator 22 employs a resilient connection 24 to pole holder 12. Signal rod 26 connects from resilient connector 24 with signal means 28 affixed towards distal end 30 of signal rod 26. Clevis pin 16 has angle projection 32 on bail 33 of clevis pin 16. Angle projection 32 on bail 33 holds distal end 30 of signal rod 26. End cap 34 closes pole holder 12 at one end.

Now turning to FIGS. 2 and 3 new device 10 is thereshown. In FIG. 2, strike indicator 22 is shown in cocked position 36 ready to indicate a strike; while in FIG. 3, strike indicator 22 is shown in deployed position 38 indicating occurrence of a strike. Fishing pole 40 is shown inserted into pole holder 12. Visor 42 extends from pole holder 12.

Figure 4:
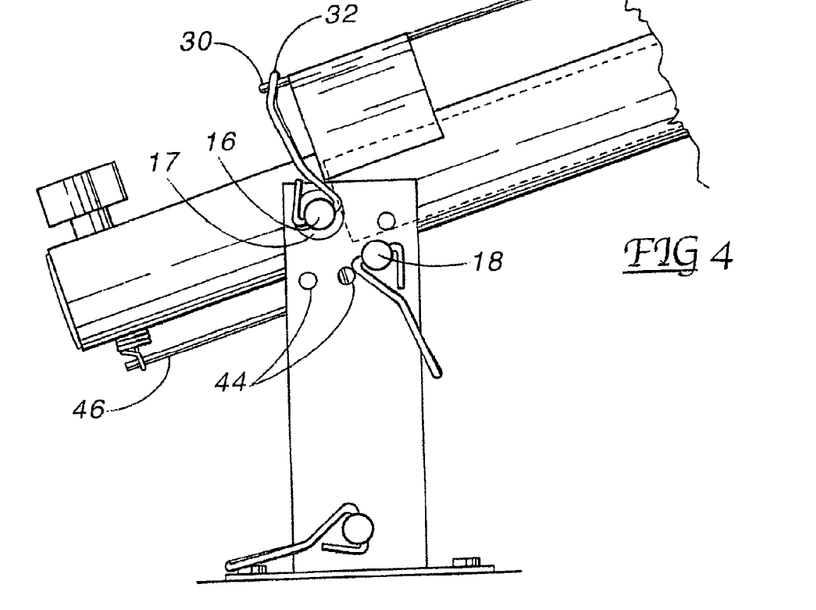
FIG. 4 illustrates a broken side view of the new holding device with the hollow elongated pole holder in an upwardly angled position holding a fishing pole with the signal rod held in the non-signal position.
Figure 5:
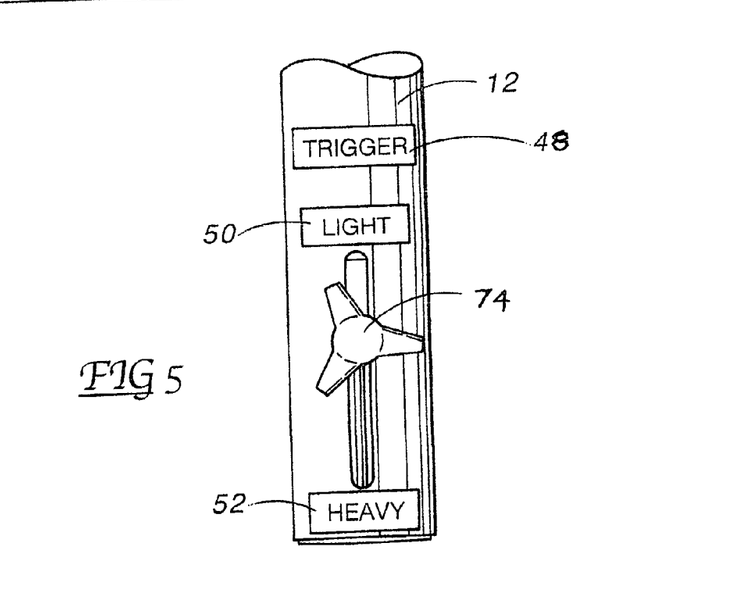
FIG. 5 illustrates a top view of the trigger mechanism set closer to the light setting.

Travel of fishing pole 40 within pole holder 12 is limited by clevis pin 16 engagement though pole holder 12. Tension or sensitivity of strike indicator 22 can be adjusted by moving rotating clevis pin 16 thus positioning angle projection 32 of clevis pin 16 along signal rod 26 from distal end 30 towards signal means 28. FIG. 4 shows angle projection 32 of clevis pin 16 moved farther back on signal rod 26 closer to distal end 30.

Frame 14 has apertures 44 disposed therethrough. Clevis pin 18 can be placed though apertures 44 allowing pole holder 12 to be pivoted on clevis pin 16 and to be locked at a selected angle.

Trigger mechanism 46 is depicted in FIGS. 4-8. Trigger mechanism 46 is adjustable for use with a light fishing pole with tackle and a heavy fishing pole with tackle. Labels can be affixed to pole holder 12, with label 48 to indicate trigger mechanism 46, label 50 to indicate light adjustment and label 52 to indicate heavy adjustment of trigger mechanism 46.

Figure 6:
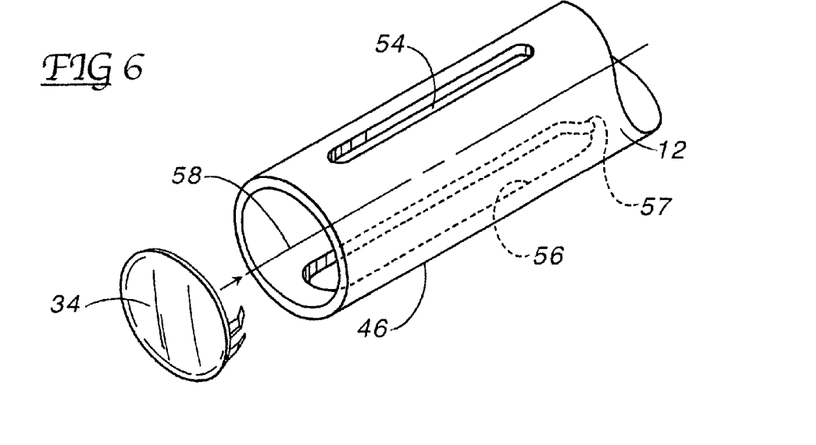
FIG. 6 illustrates a partial exploded perspective view of the hollow elongated pole holder and the end cap.

FIG. 6 depicts trigger mechanism 46 employs elongated slots 54 and 56 disposed through opposite sidewalls of pole holder 12 and centered on centerline 58 of pole holder 12. Elongated slot 56 is wider and longer than elongated slot 54. Elongated slot 56 tapers at end 57 away from end of pole holder 12. End cap 34 fits to end of pole holder 12.

Figure 7:
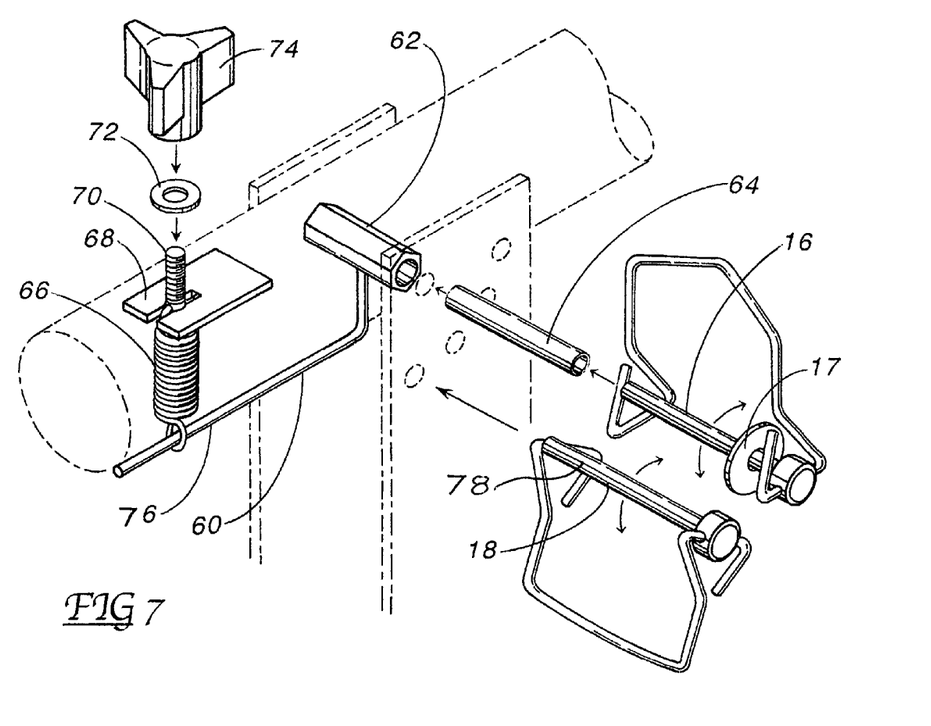
FIG. 7 illustrates an exploded perspective view of the trigger mechanism.

Trigger mechanism 46 employs elongated slots 54 and 56 through pole holder 12 aligned to each other and to center line 58 of the hollow elongated pole holder 12. Trigger mechanism 46 is adjustable for various weights of poles and tackles. Trigger mechanism 46 comprises L-shaped swing arm attached to connector tubing 62, connector bushing 64, main spring 66, adjustment plate 68 with lock down bolt 70 affixed to adjustment plate 68, washer 72 and tension knob 74 to lock main spring 64 in position along long arm 76 of L-shaped swing arm 60 to provide different levels of tension to trigger device 10. Main spring 66 attaches to adjustment plate 68 and to long arm 76 of L-shaped swing arm 60.

Figure 8:
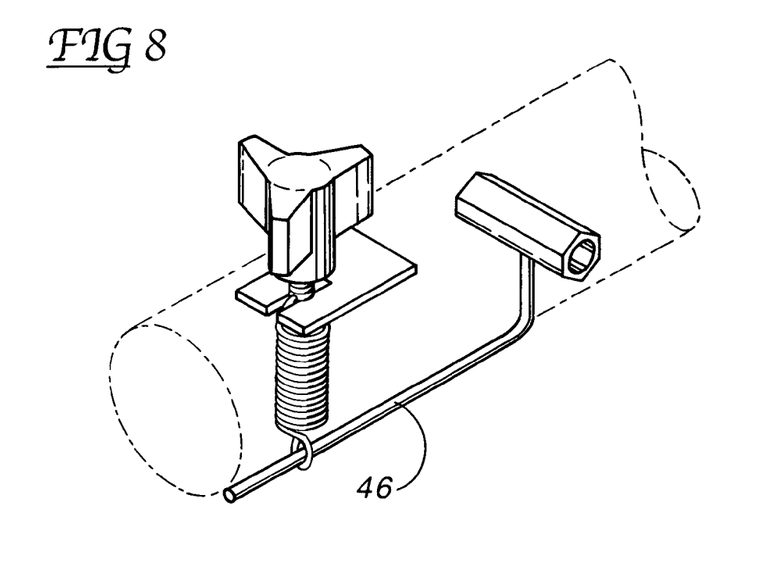
FIG. 8 illustrates a perspective view of the assembled trigger mechanism.

When tension knob 74 is unscrewed to loosen, main spring 66 can be moved along long arm 76 of L-shaped swing arm 60 thereby allowing adjustment of trigger mechanism 46 for use for a range of fishing poles and tackle having a weight from light to heavy. Tension knob 74 is tightened to lock trigger mechanism 46 at desired location and for weight of fishing pole as selected by user. FIG. 8 depicts trigger mechanism 46 as assembled.

Locking device 78 is positioned through frame 14 stabilizes swing arm 60 in position allowing main spring 66 to be moved along length of long arm 76 of L-shaped swing arm 60. Clevis pin 18 can operate as locking device 78.

Figure 9:
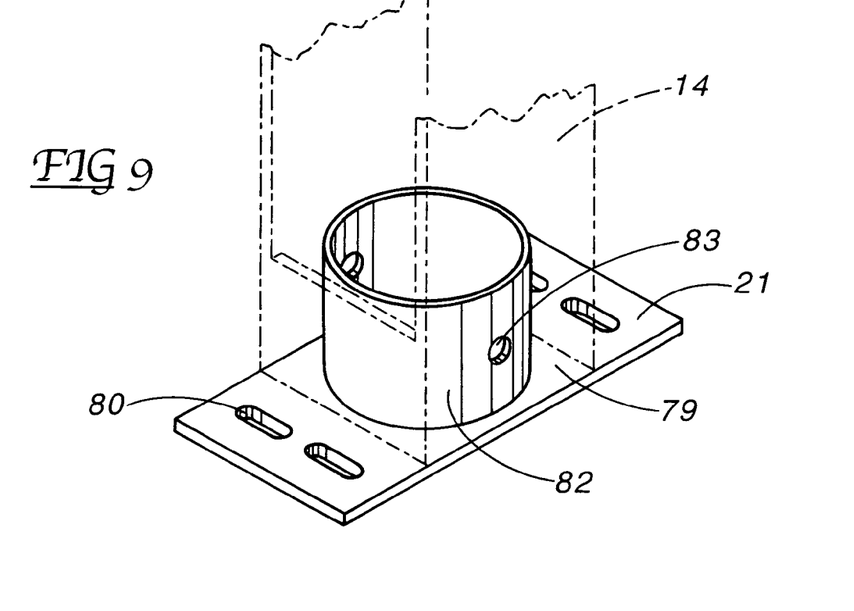
FIG. 9 illustrates a mounting plate.

Now turning to FIG. 9 mount 21 is shown as connecting frame 14 to a multiplicity of surfaces. Mount 21 has a base plate 79, apertures 80 through base plate 79 and upright 82 extending from base plate 79. Frame 14 attaches to mount 21 by clevis pin 20 (shown in FIG. 1).

Hollow elongated pole holder. 12 is quickly detachable from mount 21 by removing clevis pin 20. Frame 14 can be rotated on the mount into different rotational position. Position of frame 14 is rotationally adjusted. Reinserting clevis pin 20 through holes 83 in upright 82 of mount 21 locks frame 14 at different location.

Figure 10:
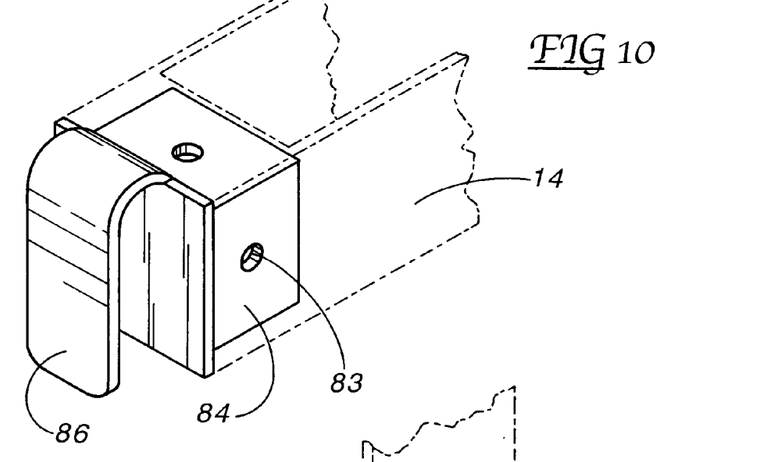
FIG. 10 illustrates a mounting plate having a tab.

Mount 84 is depicted in FIG. 10. Frame 14 attaches to mount 84. Mount 84 employs tab 86 allowing frame 14 and device 10 to be positioned from a vertical orientation. Mount 84 can be used with a bucket or boat gunwale.

Figure 11:
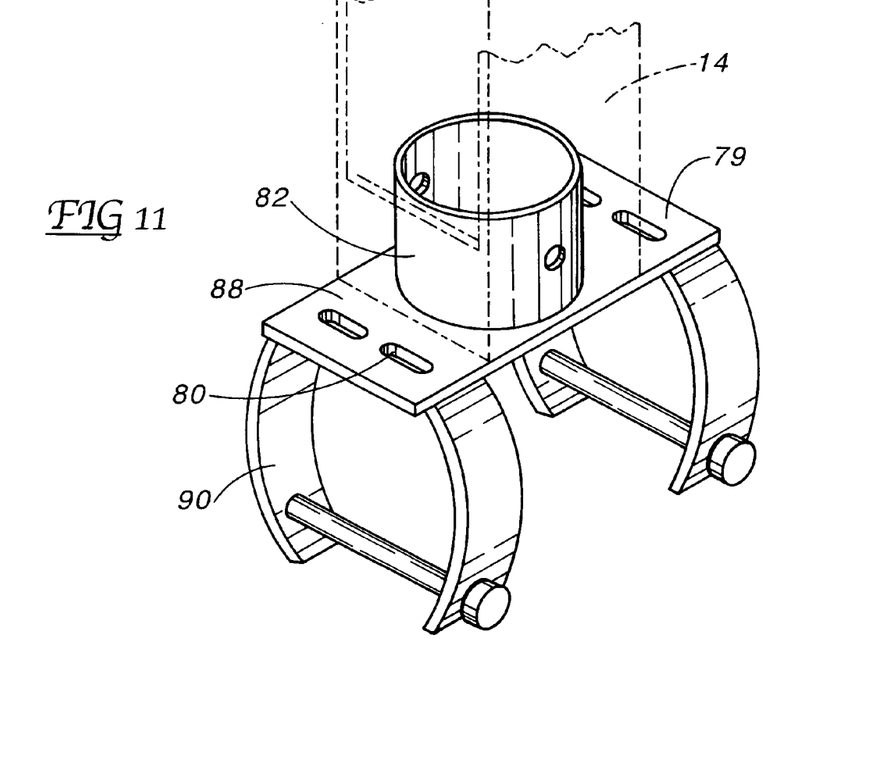
FIG. 11 illustrates a mounting plate having bails.

Mount 88 is depicted in FIG. 11. Mount 88 employs a base plate 79, apertures 80 through bae plate 79 and upright 82 and connectors 90 extending from base plate 80 for positioning around railing (not shown).

Figure 12:
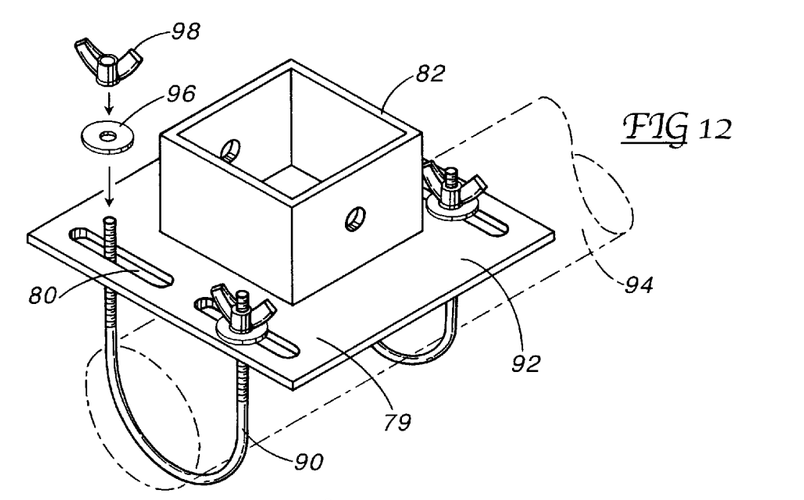
FIG. 12 illustrates a perspective view of a mount with bails.

Mount 92 is depicted in FIG. 12. Mount 92 employs a base plate 79, apertures 80 through base plate 79 and upright 82 hereshown as square and connectors 90 extending into base plate 79 for positioning around railing 94 shown in phantom. Washers 96 and wing nuts 98 lock connectors 90 around railing to mount 92.

Figures 13, 14:
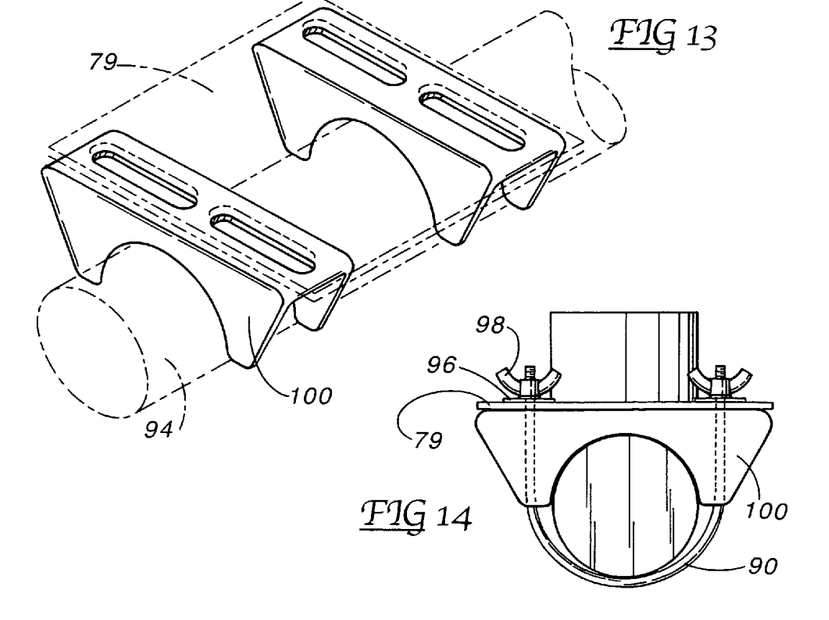
FIG. 13 illustrates a perspective view of supports for a mount.
FIG. 14 illustrates a side view of supports of FIG. 13 for a mount fitted to a rail.

Supports 100 for mount 79 are depicted in FIG. 13. Supports 100 have arms extending from flat portion and having partial arcuate portion fittable to round railing 94 shown in phantom. Apertures 80 in supports 100 aligned with apertures 80 in base plate 79 (shown herein in phantom).

Supports 100 for mount 79 (shown in phantom) fit to railing 94 in FIG. 14. Connectors 90 are positioned through supports 100 and through base plate 79 and are locked with washers 96 and wing nuts 98.

Figure 15:
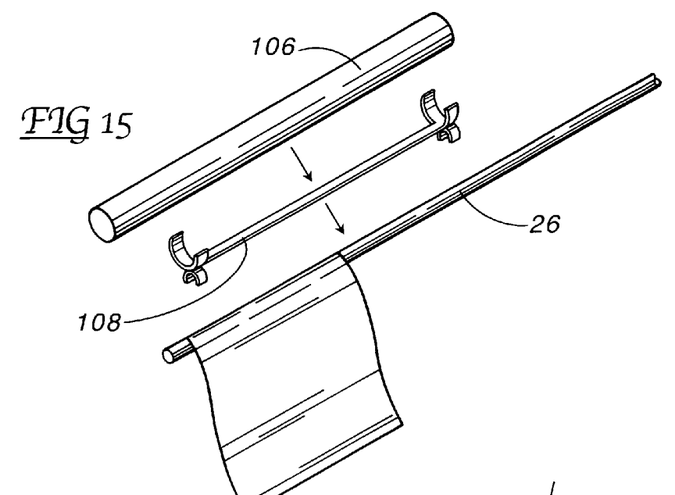
FIG. 15 illustrates a partial exploded perspective view of a light device affixed to a signal rod.
Figure 16:
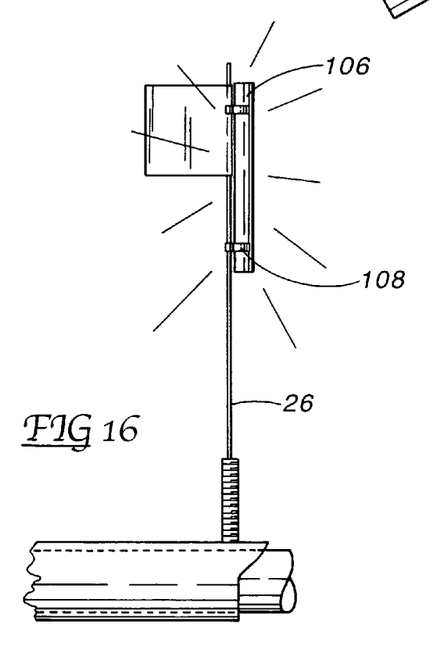
FIG. 16 illustrates a side view of a light device affixed to a signal rod.

Light device 106, connecting bracket 108 and signal rod 26 are shown in FIG. 15. Light device 106 activated to produce light is shown assembled to signal rod 26 by connecting bracket 108 in FIG. 16.

Figure 17:
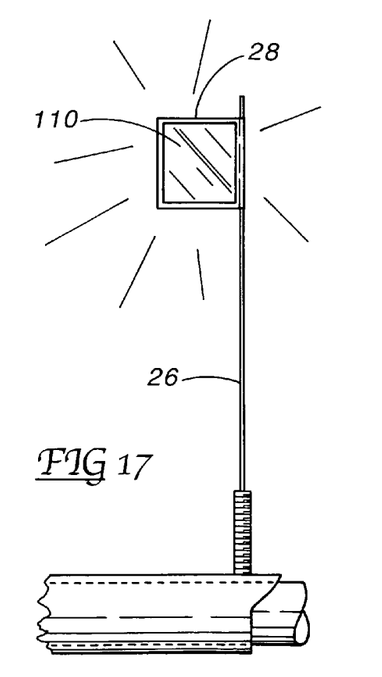
FIG. 17 illustrates a side view of a luminous light storage material or reflective material affixed to the flag of the signal device.

Luminous light storage material or reflective material 110 is shown affixed to flag 28 on signal rod 26.

Figure 18:
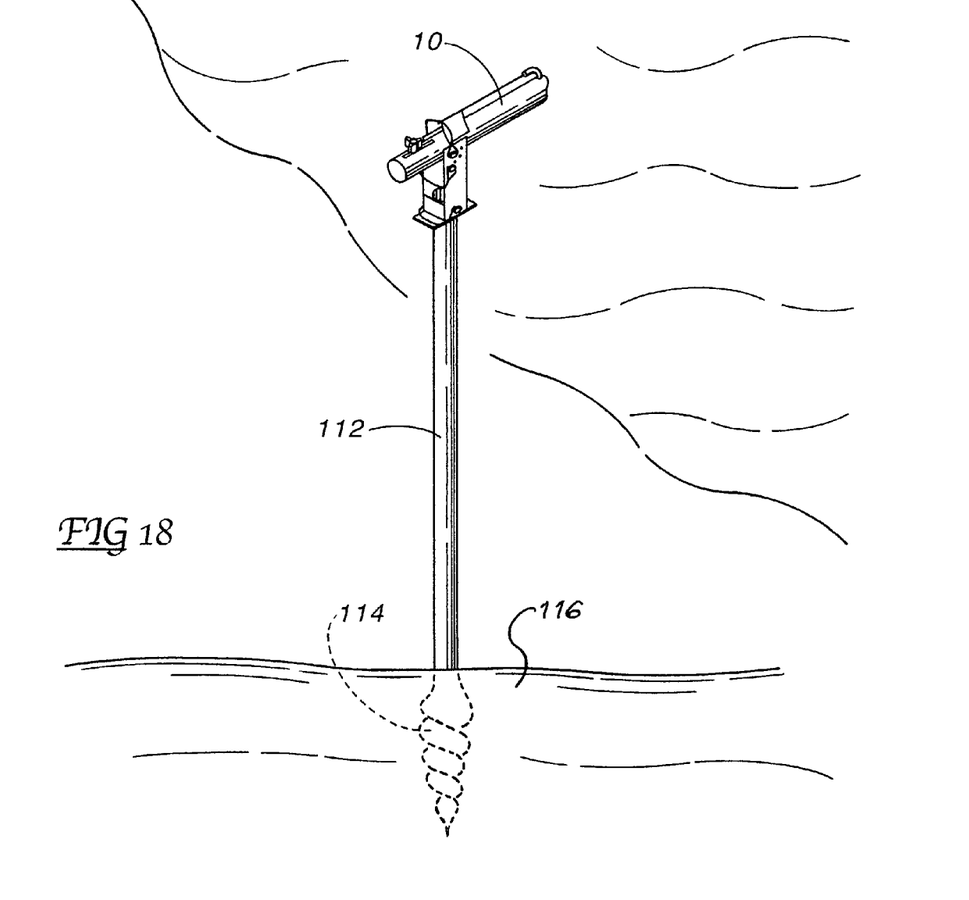
FIG. 18 illustrates a perspective environmental view of the new holding device for holding a fishing pole therein mounted to a support terminating in an auger for placement into a surface of the ground or ice.

Holding device 10 is shown mounted to post 112 terminating in auger 114. Auger 114 can be placed into ground 116 or ice (not shown).

The invention claimed is:

1. A device for holding a fishing pole and indicating a strike comprising:
    an elongated hollow tube for emplacement of the fishing pole, the elongated hollow tube having a wall and a center line therethrough and at least two longitudinal slots through the wall, the at least two longitudinal slots being aligned with each other and within the same plane of the center line;
    an adjustable control mechanism positioned close to the longitudinal slots of the tube, the adjustable control mechanism being adjustable between one of a differing weight of a heavy fishing pole and tackle and a lighter fishing pole and tackle;
    a frame attached to the tube for holding the fishing pole, the tube for holding the fishing pole being pivotable on the frame and positionable between a vertical orientation and a horizontal orientation; and
    a resiliently biased strike indicator for indicating pull on a line of the fishing pole inserted into the elongated hollow tube,
    wherein the adjustable control mechanism comprises an adjustment plate, a swing arm and a spring connecting the adjustment plate and the swing arm, the spring being movable forward and backward within the tube for holding the fishing pole.

2. The device for holding a fishing pole and indicating a strike according to claim 1 further comprising an adjustment for adjusting sensitivity of the resiliently biased strike indicator.

3. A device for holding a fishing pole and indicating a strike comprising:
    an elongated hollow tube having at least a first end and a second end for emplacement of the fishing pole into the first end, the elongated hollow tube having a wall and a center line therethrough and at least two longitudinal slots through the wall, the at least two longitudinal slots being aligned within the same plane and with the center line, the at least two longitudinal slots being located near to the at least second end of the elongated hollow tube away from the first end for emplacement of the fishing pole, each of the at least two longitudinal slots forming a contiguous opening through the elongated hollow tube;
    an adjustable control mechanism positioned close to the longitudinal slots of the tube, the adjustable control mechanism being adjustable between one of a differing weight of a heavy fishing pole and tackle and a lighter fishing pole and tackle;
    a frame attached to the tube for holding the fishing pole, the tube for holding the fishing pole being pivotable on the frame and positionable between a vertical orientation and a horizontal orientation; and
    a resiliently biased strike indicator for indicating pull on a line of the fishing pole inserted into the elongated hollow tube, wherein the adjustable control mechanism comprises an adjustment plate, a swing arm and a spring connecting the adjustment plate and the swing arm, the spring being movable forward and backward within the tube for holding the fishing pole.

4. The device for holding a fishing pole and indicating a strike according to claim 3 further comprising an adjustment for adjusting sensitivity of the resiliently biased strike indicator.

* * * * *